A. R. COOPER.
NUT LOCK.
APPLICATION FILED APR. 19, 1909.
936,091. Patented Oct. 5, 1909.
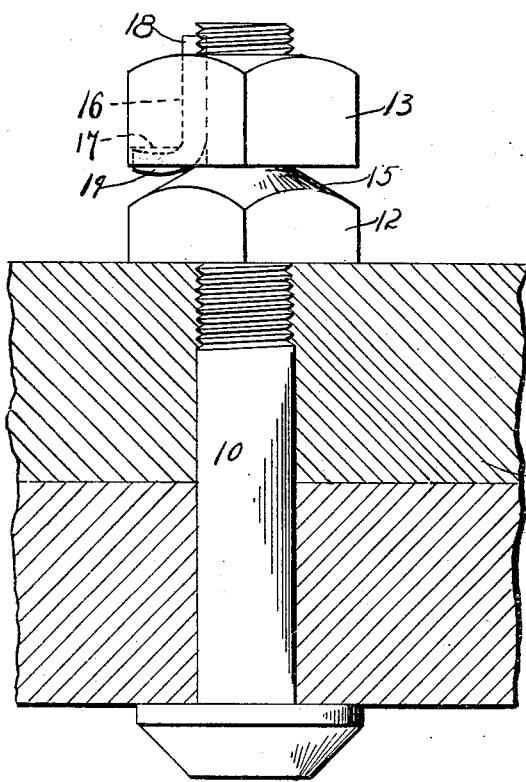
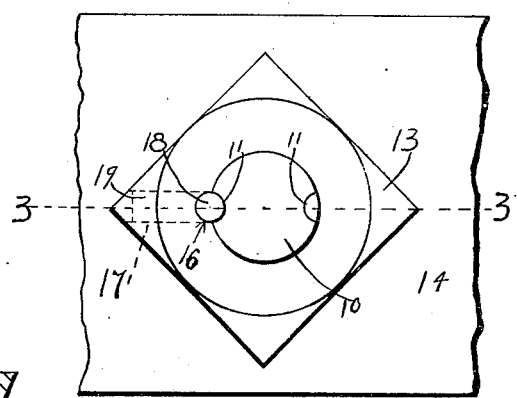
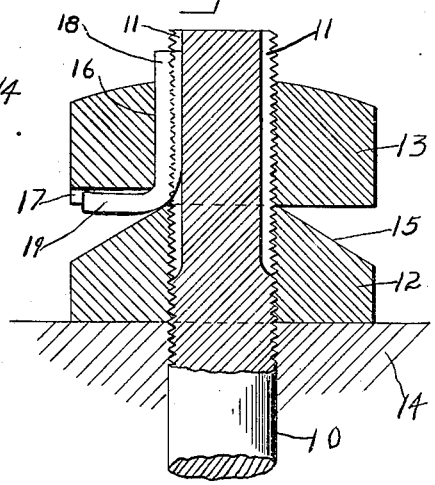
Witnesses
Inventor
Angus. R. Cooper.
By Chandler & Chandler
Attorney

UNITED STATES PATENT OFFICE.

ANGUS R. COOPER, OF MOBILE, ALABAMA.

NUT-LOCK.

936,091.   Specification of Letters Patent.   Patented Oct. 5, 1909.

Application filed April 19, 1909. Serial No. 490,872.

*To all whom it may concern:*

Be it known that I, ANGUS R. COOPER, a citizen of the United States, residing at Mobile, in the county of Mobile, State of Alabama, have invented certain new and useful Improvements in Nut-Locks; and I do hereby declare the following to be a full, clear, and exact description of the invention, such as will enable others skilled in the art to which it appertains to make and use the same.

This invention relates to nut locks, and has for its object to improve the construction and increase the utility and efficiency of devices of this character.

With this and other objects in view, the invention consists in certain novel features of construction as hereafter shown and described and then specifically pointed out in the claim, and in the drawings illustrative of the preferred embodiment of the invention, Figure 1 is a side elevation of the improved device with the supporting body in section. Fig. 2 is a plan view of the same. Fig. 3 is a section on the line 3—3 of Fig. 2.

The improved device comprises a bolt 10 having one or more grooves 11 extending longitudinally thereof and transversely of the threaded portion, as shown.

Two nuts are employed in the improved device, and for the purpose of this description one of the nuts will be denominated the main nut and is designated by the character 12, and the other nut is designated as a jam nut and is designated by the character 13. The main nut 12 bears upon the structure represented at 14 through which the bolt extends, and is formed with an outer conical surface 15. The main nut is of the usual form and differs only from an ordinary nut by having the conical surface 15.

The jam nut 13 is provided with an internal groove 16 extending longitudinally of its threads and likewise provided with a radial groove 17 communicating at its inner end with the internal groove 16. The jam nut is designed to be placed over the bolt 10 after the main nut has been turned "home" by the wrench or other implement, and will be rotated until its groove 16 registers with one of the grooves 11 of the bolt, and by providing a plurality of grooves 11 the jam nut may be turned home, rotating the same only a portion of a full revolution as will be obvious. After the jam nut has been rotated in the proper position, as above described, the pin of the bendable metal represented at 18 is driven into the registering grooves until its inner end 19 comes in contact with the conical surface of the nut 12, when the bendable pin will be turned to one side and into the radial groove 17, as shown in Fig. 3, and thus locks the jam nut firmly in position upon the bolt and thus not only locking the jam nut in position, but likewise locking the main nut 12.

The improved device is simple in construction, can be inexpensively manufactured, and firmly and rigidly holds the nuts in position upon the bolt, and effectually prevents all retrograde movement of the nuts.

The improved device may be employed upon bolts of various sizes, and upon bolts employed for various purposes, and it is not desired therefore to limit the invention to use upon any particular size of bolt or for bolts employed for any particular purpose.

What is claimed is:—

The combination with a bolt having a longitudinal groove, of a main nut having a conical outer face, a jam nut having an internal groove transversely of its threads and a radial groove in the inner face communicating with said internal groove, and a bendable pin forced into said bolt groove and the internal jam nut groove and caused to be deflected into the radial groove by contact with the conical face of the main nut.

In testimony whereof, I affix my signature, in presence of two witnesses.

ANGUS R. COOPER.

Witnesses:
H. V. COOPER,
J. V. SCHAEDEL.